April 26, 1955
K. D. LEGG
2,707,061
TRAILER WITH LOADING MEANS
Filed Jan. 31, 1952
3 Sheets-Sheet 1
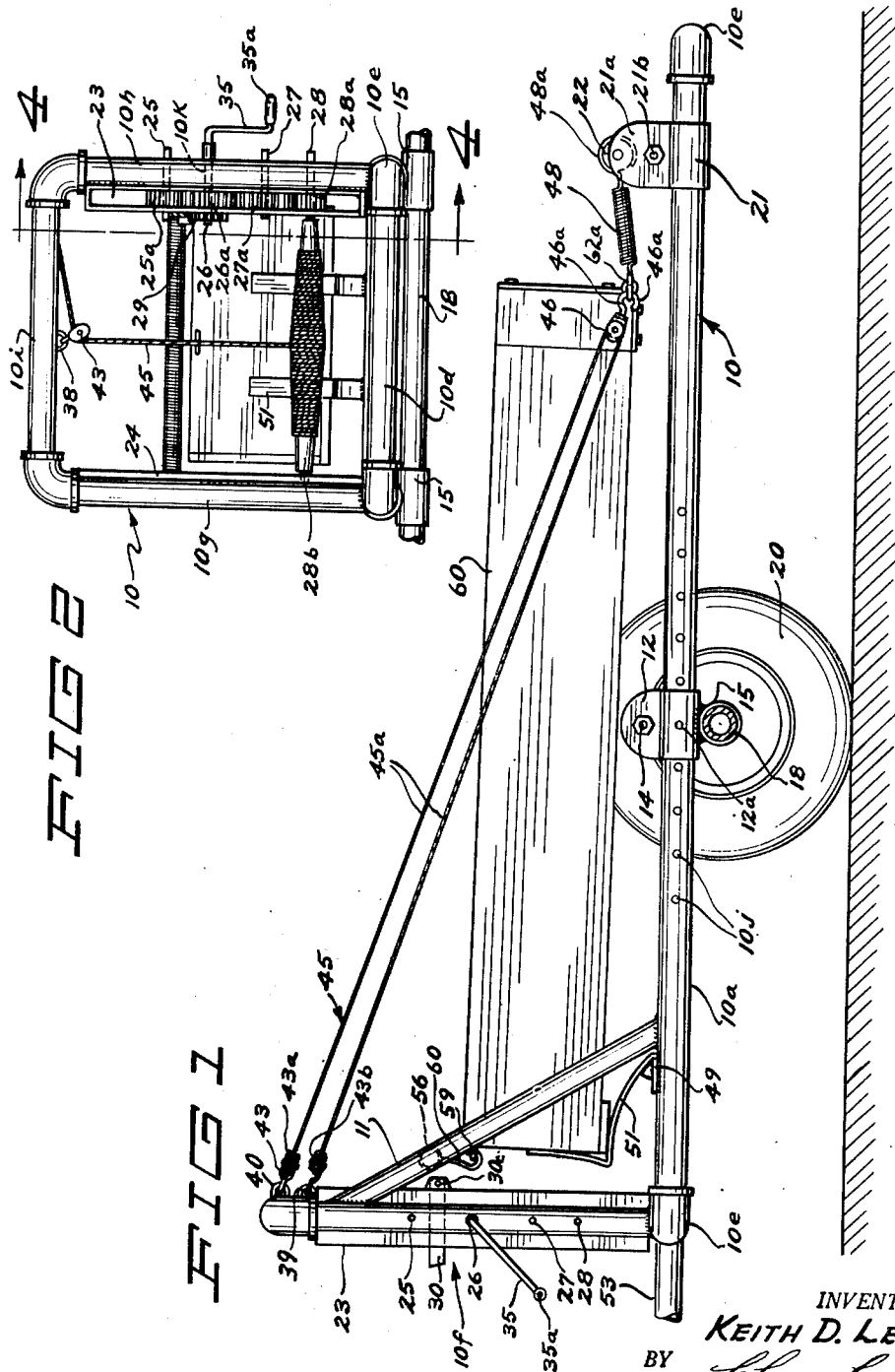
INVENTOR.
KEITH D. LEGG
BY
Chas. C. Reif
ATTORNEY

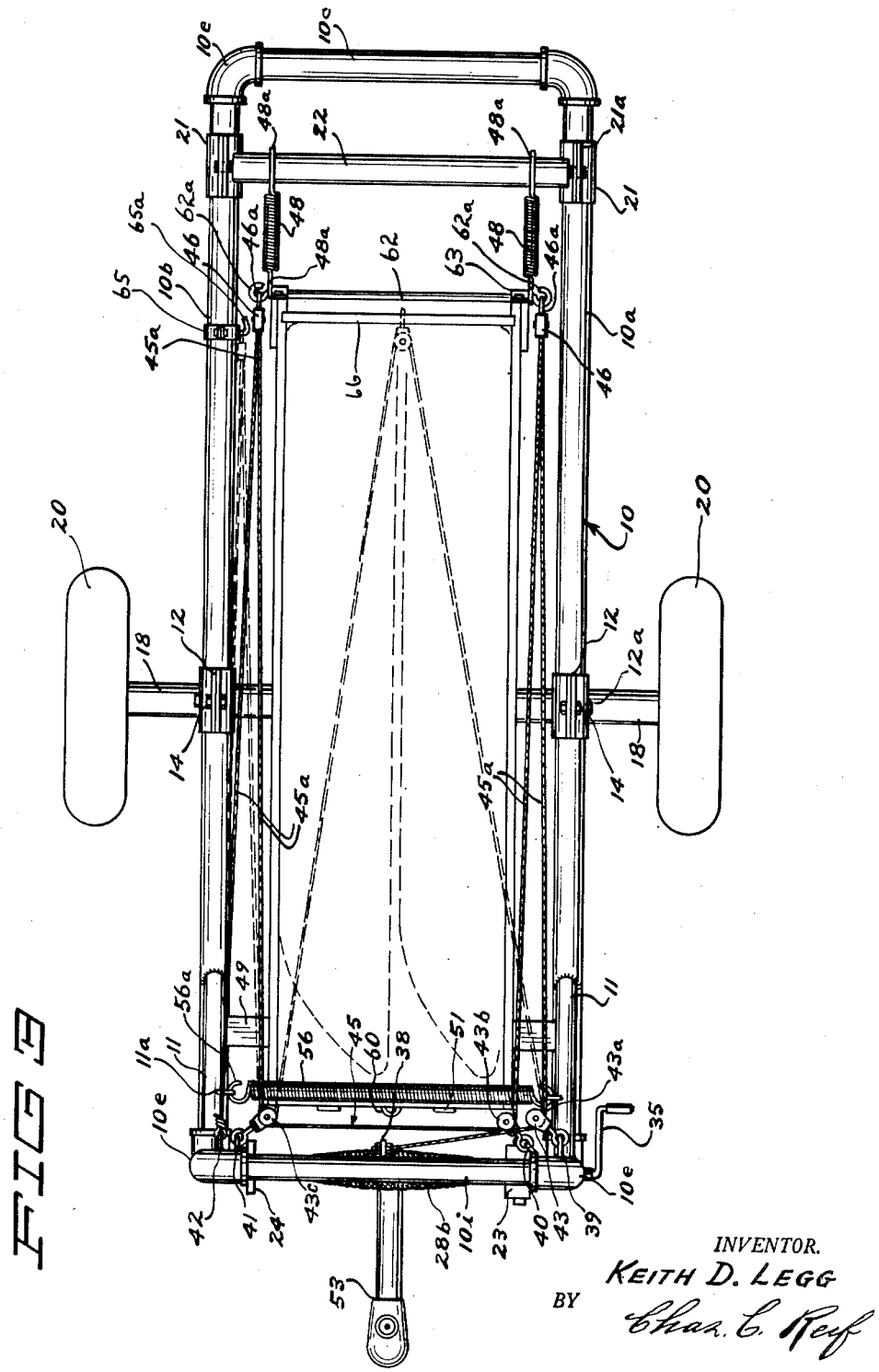

April 26, 1955 K. D. LEGG 2,707,061
TRAILER WITH LOADING MEANS
Filed Jan. 31, 1952 3 Sheets-Sheet 3
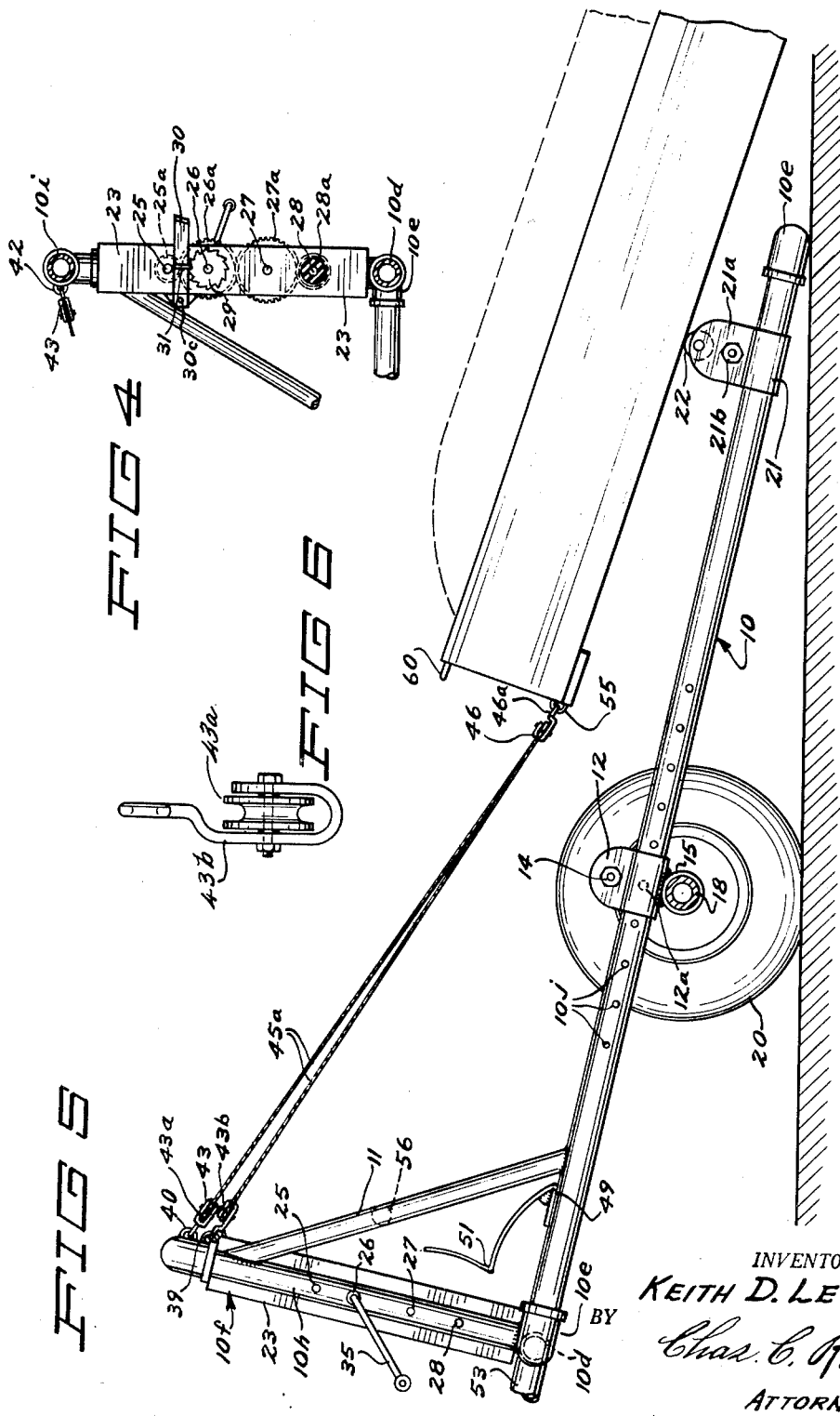
INVENTOR.
KEITH D. LEGG
BY Chas. C. Reif.
ATTORNEY United States Patent Office 2,707,061
Patented Apr. 26, 1955

2,707,061

TRAILER WITH LOADING MEANS

Keith D. Legg, Minneapolis, Minn.

Application January 31, 1952, Serial No. 269,249

10 Claims. (Cl. 214—506)

This invention relates to a trailer structure and more particularly to a trailer structure adapted to carry a boat or a wagon box or truck body, together with means for holding the same in a desired position and to provide a means for loading the same onto said trailer.

It is therefore an object of this invention to provide a trailer particularly adapted to carry a boat, wagon box or a truck body and to hold the same in resilient suspension.

It is another object of this invention to provide a trailer structure adapted to have means thereon for loading a boat thereon from a floating position in a body of water or to load a boat, wagon box or a truck body from a position on the ground.

It is another object of this invention to provide a trailer comprising a wheel supported frame, a windlass on said frame and cables operated by said windlass for moving an object such as a boat, wagon box or truck body onto said trailer and also acting to hold said object in position on said trailer, together with additional means for holding said object in desired position.

It is still another object of this invention to provide a trailer comprising a frame generally rectangular in plan having an upstanding portion at one end thereof, a pair of wheels for supporting said frame, a roller bar mounted on said frame at the rear end thereof, a pair of plate springs adjacent the front end of said frame, a plurality of reduction gears carried by said upstanding portion, means to actuate said gears, a windlass roller rotated by said gears, a cable adapted to be wound about said windlass roller, a plurality of pulleys mounted in spaced relation on said portion, said cable moving over said pulleys, a third pulley movable on said cable whereby said third pulley may be secured to a boat, a wagon box or truck body and the latter be drawn onto said frame.

It is more specifically an object of this invention to provide a trailer structure comprising a frame generally rectangular in plan having an upstanding portion at one end thereof, a wheel-equipped axle for supporting said frame, said axle and wheels being movable longitudinally of said frame, a roller mounted adjacent the rear end of said frame, a pair of plate springs mounted adjacent the front end of said frame, a plurality of reduction gears carried on said portion, a crank to operate said gears, a windlass rotated by said gears, a cable adapted to be wound on said windlass, a plurality of pulleys mounted in spaced relation on said upstanding portion, said cable being arranged to run over said pulleys, and a pair of spaced coiled tension springs adapted to be secured to said roller whereby said cable may be secured to one end of a boat, a wagon box or truck body and the same may be drawn onto said frame and carried in resilient suspension, being supported at one end by said plate springs and held at the other end by said coiled tension springs and also held in position by said cable.

These and other objects and advantages of the invention will be fully set forth in the following description made in connection with the accompanying drawings in which like reference characters refer to similar parts throughout the several views and in which:

Fig. 1 is a view of applicant's invention in side elevation with some parts shown in vertical section;

Fig. 2 is a partial view of applicant's invention in front elevation;

Fig. 3 is a top plan view of applicant's invention;

Fig. 4 is a view taken on line 4—4 of Fig. 2, as indicated by the arrows;

Fig. 5 is a modification of applicant's invention shown in side elevation; and

Fig. 6 is a view in side elevation of a pulley block used.

Referring to the drawings, a trailer structure is shown comprising a frame 10. Said frame is generally rectangular in plan and in the embodiment of the invention as illustrated, said frame is shown as made of suitably sized members illustrated as tubular. Said frame 10 comprises side members 10a and 10b, and end members 10c and 10d, said side and end members being shown as connected by suitable elbows or coupling members 10e. Secured to one end of said frame 10 is an upstanding portion or end 10f. Portion 10f may be formed in the same manner as said frame 10 and has side members 10g and 10h and a top member 10i, said members 10g and 10h being secured to elbows 10e in any suitable manner, as by welding. Said portion 10f is supported by braces 11 which extend from said end portion to frame 10 and are suitably secured to frame 10, as by welding. Said side members 10a and 10b have longitudinally spaced indentations 10j at their outer sides.

Secured to side members 10a and 10b respectively are brackets 12 which encircle said side members and have flanges which are connected by headed and nutted bolts 14. Said bolts can be loosened to permit said brackets to be moved longitudinally of said side members and be tightened to hold said clamp in any desired longitudinal position. Each of said brackets has a projection 12a which is adapted to be received in any one of said apertures 10j to assist in holding said brackets in any desired longitudinal position. Brackets 12 have lower bearing portions 15 carrying an axle 18 and said axle carries wheels 20. In the embodiment of the invention as illustrated, said wheels are shown as having pneumatic tires thereon.

Brackets 21 are provided. Said brackets have lower end portions embracing side members 10a and 10b respectively adjacent the rear ends thereof and have upwardly extending flanges 21a through which pass headed and nutted bolts 21b. Extending between said brackets is a roller 22 having trunnions journaled in said flanges 21a.

A rectangular frame member 23 is secured to the inner side of member 10h, as by welding, and said frame member extends longitudinally of member 10h. A bar member 24 is secured, as by welding, to the inner side of member 10g and said bar member extends longitudinally of member 10g. In the embodiment of the invention as illustrated, portions of member 23 and member 24 are shown as rectangular in transverse section.

A shaft 25 extends between the sides of member 23 and has its ends journaled therein adjacent the upper end portion thereof. Carried by said shaft 25 is a gear 25a. Spaced below shaft 25 and carried in the same manner by member 23 is a shaft 26, and carried by said shaft 26 is a gear 26a which meshes with gear 25a. Said last mentioned gear is substantially larger in diameter than said gear 25a. Spaced below said shaft 26 and carried by member 23 in the same manner as shafts 25 and 26, is a shaft 27. Carried by shaft 27 is a gear 27a. Said gear 27a is substantially larger in diameter than gear 26a and meshes therewith. Member 10h is provided with vertically spaced apertures 10k, the same being in axial alignment with said shafts. Said shafts have end portions extending through said apertures and said end portions are polygonal in cross section.

Spaced below said shaft 27 is a shaft 28 extending between members 23 and 24 and having its ends journaled therein. A windlass drum or roller 28b tapering in diameter toward tis ends is secured to shaft 28. Carried by shaft 28 is a gear 28a and said gear has a diameter smaller than that of gear 25a and the same meshes with gear 27a.

A crank 35 having a handle portion 35a is provided, the same being formed to fit over the ends of shafts 25, 26, 27 and 28 respectively. Said shaft 26 has a portion which extends through the inner side of member 23 for a short distance and has secured thereto a ratchet wheel 29. A bar 30 is swingably secured as by a headed and nutted bolt 30c to member 23 adjacent ratchet wheel 29 and carries a ratchet pawl 31.

Referring to Figs. 1 and 3, an apertured lug or staple 38 is secured to member 10i substantially midway thereof. Spaced apertured lugs or staples 39, 40, 41 and 42 10e of said upstanding portion 10f. Pulley blocks 43, 43b and 43c having rings or loops at one end are respectively secured to lugs 39, 40 and 41, said rings or loops passing through said lugs so that said blocks are swingably mounted. Said pulley blocks have journaled therein pulleys 43a. A cable 45 is provided which may be made of rope, wire or any other suitable flexible material. Cable 45 is secured at one end to windlass 28b and the other end thereof is secured to said lug 42. Said pulley blocks, particularly blocks 43b and 43c, have open sides so that cable 45 may be laterally removed therefrom, as shown in Fig. 6.

Pulley blocks 46 are provided and the same have hooks 46a extending therefrom, and said pulley blocks 46 are movable on cable 45 as will be later described. Said last mentioned pulley blocks may be of the open or slotted type, such as pulley block 43b.

Coiled tension springs 48 are provided, the same having hooks 48a extending from each end thereof, said hooks at one of said ends embracing roller 22 adjacent the ends thereof. The said hooks at the other ends are adapted to engage an object supported on said trailer, as later described.

Adjacent the front end of said frame 10 is a bar 49 extending horizontally across said frame and is secured thereto by any suitable means, such as by welding. Secured to bar 49 and spaced longitudinally thereon are plate springs 51. In the embodiment of the invention as illustrated, said plate springs are shown as having their lower ends respectively secured to said bar 49, as by welding, and extending upwardly and rearwardly at a substantial angle from the plane of said frame and having vertically extending upper end portions. Said springs are adapted to resiliently support an object carried on the trailer, as later described.

Centrally spaced of end member 10d is a hitch 53 of suitable construction and secured to said member 10d in any suitable manner, as by welding. A strong coiled tensile spring 56 is provided extending between members 11 somewhat above the mid-portion thereof. Said spring has hooks 56a at each end thereof and the same are adapted to be secured to staples 11a provided on members 11. A hook 59 is provided and is here shown as an S hook adapted to embrace said spring 56 with its upper portion and adapted to be secured to a staple to be provided in the object to be carried on said trailer.

In operation, to load an object such as a boat, wagon box or truck body, said trailer will be tipped downwardly at its rear end, as shown in Fig. 5, axle 18 and wheels 20 being disposed somewhat forwardly. For loading a boat, said rear end may be disposed in the water at the shore of a river or lake. The cable 45 will be disengaged from the pulley blocks 43b and 43c. One of the pulley blocks 46 will be removed from cable 45. The pulley block left on cable 45 will be secured onto a suitabe connecting means such as staple 55, as shown in Fig. 5, provided at the prow of a boat or front end of a wagon box or truck body.

The end portion of crank 35 is then engaged with an end portion of one of the shafts 25, 26, 27 or 28. Said crank may be engaged with any one of said shafts to directly rotate the desired gear and to secure the desired speed of rotation of said windlass. Said crank is then turned thus rotating said windlass through said shafts and gears and thus cable 45 will be wound on said windlass 28b. The tapered form of drum 28b will tend to cause the cable to wind evenly at each end of said drum, as shown in Fig. 2, particularly since the cable is fed downwardly over pulley 43 substantially at the center of said drum. As cable 45 is wound on drum 28b it will draw the object being loaded, shown as wagon box 60, up over roller 22 and forwardly onto said frame until the front or forward end of said object is over springs 51. Said object can then be positioned to rest on the lower portions of said springs and against the upwardly extending portions thereof, as shown in Fig. 1.

Spring 56 and hook 59 may be used as an auxiliary or alternative holding means with hook 59 embracing said spring with its upper portion and being secured to a staple 60 with its lower portion. Said staple 60 is provided at the upper front end portion of the object to be carried.

Coiled springs 48 are next positioned with each having one end disposed about roller 22 and the other end engaging means provided at each side rear end portion of said object. In Figs. 1 and 3 such a means is shown as a rod 62 having eyelets 62a at its ends, which rod extends through staples or loops 63 secured to the end of object 60. Springs 48 are engaged about the end portions of rod 62. The object can also be held in position by cable 45. Said cable will be pulled taut and pawl 31 engaged with ratchet wheel 29.

Alternately if desired, pulley block 46 could be disengaged from the front end portion of said object. Said cable is then replaced in said pulley blocks 43b and 43c from which it was previously removed. Said cable is then unwound from said windlass for a substantial distance so that two looped portions 45a respectively may be formed by the portions of the cable between lug 42 and block 43c and between blocks 43 and 43b. Pulley blocks 46 by means of hooks 46a are then placed to be respectively attached to said eyelets 62a, as shown in Fig. 3. Said cable is then pulley taut and said object is securely held in resilient suspension on said frame, pawl 31 being engaged with ratchet wheel 29. Said cable is held in taut position by engaging ratchet gear 30 and pawl 31.

As another alternative, as shown in Fig. 3, one of the pulley blocks 46 may be attached to a hook portion 65a of a clamping member 65. Said clamping member is a common screw clamp disposed about the rearward portion of member 10b and the same having a hook 65a extending from its side adjacent the inner side of member 10b.

Cable 45a is disengaged from pulley block 43b and a loop portion of said cable is formed between pulley blocks 43 and 43c and the said loop portion will carry a pulley block 46 thereon. The operation then continues as first above described. This modification of the operation of loading an object on applicant's device requires less unwinding and winding of said cable on said windlass. When the object is drawn onto applicant's device, pulley block 46 may be disengaged from the front portion of said object and secured to a bar member 66 extending transversely across the end of said object. Cable 45a is then placed in a taut position as previously described, and said object is held in position on applicant's device.

If said object is a wagon box or truck body, the forward portion of said object may be raised by tightening cable 45, as first described, and if said object is provided with a tail or an end gate, the contents of the same may be easily unloaded or dumped.

An alternative method for loading said object onto said trailer is by lifting the front end portion of said object onto said roller 22. Then portions 45a of cable 45 carrying blocks 46 will be secured to eyelets 62a, and said cable will be wound on windlass 28b. The remainder of the operation is as previously described.

There are many other uses for which said trailer structure may be utilized than those indicated and such uses are in no manner limited to those described in the above operation. With the axle 18 and wheels 20 well forward, the single pulley block 46 could be used to lift an end of an automobile at the front side of the trailer, by engaging hook 46a with a bumper of said automobile. Even with the wheels disposed rearwardly, a block could be placed under the front of frame 10 and one end of an automobile could be lifted with the cable.

Thus it is seen that I have provided a very useful and efficient invention in a trailer structure adapted to have a boat, wagon box or truck body loaded thereon very easily and quickly and to carry the same in resilient suspension.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device of the class described having in combination, an elongated frame, a pair of wheels supporting said frame, an auxiliary vertically disposed frame at the front end of said frame, a roller extending transversely of said frame adjacent the rear end thereof, a windlass mounted on said auxiliary frame, a cable secured to one side of said auxiliary frame adjacent the top thereof, a first pulley block having an open-slotted frame secured to said auxiliary frame adjacent the secured end of said cable, a second pulley block secured to the other side of said auxiliary frame, a third pulley block having an open-slotted frame secured to said auxiliary frame adjacent said second pulley block and spaced inwardly thereof, said cable running over said first, third and second mentioned pulleys to said windlass, a pulley block and pulley movable on said cable between said first mentioned side and said first mentioned pulley block, a second pulley block and pulley movable on said cable between said second mentioned and said third mentioned pulley blocks, hooks carried by said pulley blocks whereby said hooks may engage one end of an object such as a boat or a wagon box and said cable be wound on said windlass to draw said object onto and over said roller and onto said trailer, said hooks being disengageable from the end of said object adjacent the front end of said frame and being respectively securable to the rear side end portions of said object, whereby said cable may be wound about said windlass until it is taut, and means for holding said cable in taut position for supporting said object.

2. The structure set forth in claim 1, a fourth pulley block secured to said auxiliary frame intermediate its uper end, said cable running from said second mentioned pulley over said fourth mentioned pulley and thence to said windlass.

3. The structure set forth in claim 1, a pair of tensile coiled springs in horizontally spaced relation respectively having one end adapted to embrace said roller and the opposite end adapted to be secured to the end portion of said object whereby a resilient support is provided for the rear end of said object and said object is supported at its rear end by said springs and said cable.

4. The structure set forth in claim 1, a pair of resilient holding means each having a generally horizontal portion and a vertical portion, said means carried by said frame intermediate the sides and adjacent the front end thereof whereby said means will resiliently support the front end of said object.

5. A two-wheeled trailer structure for loading and supporting a boat or box thereon having in combination, an elongated frame comprising longitudinally extending members at each side thereof, a pair of wheels supporting said frame intermediate the ends thereof, an auxiliary vertically disposed frame of considerable height at the front end of said frame and extending between said members, a roller extending transversely of said frame adjacent the rear end thereof, a cable secured at one end to one side of said auxiliary frame adjacent the top thereof, a second cable extending to the other side of said auxiliary frame adjacent the top thereof, said cables extending to adjacent the rear of said first mentioned frame and acting to support the rear end of a boat, means for moving said boat forwardly on said frame while supported on said roller, means for resiliently supporting the front end of said boat both from above and below the same, and means for resiliently supporting the rear end of said boat.

6. A structure of the type described having in combination, an elongated frame, a pair of wheels supporting said frame intermediate the ends thereof, an auxiliary vertically disposed frame of considerable height at the front end of said frame, a roller extending transversely of said frame adjacent the rear end thereof, a windlass mounted on said auxiliary frame, a cable secured at one end to one side of said auxiliary frame adjacent the top thereof, a pulley secured to the other side of said auxiliary frame adjacent the top thereof, a second pulley above said windlass, said cable running from said secured end over said first mentioned pulley to said second mentioned pulley and to said windlass, a pulley block and pulley movable on said cable between said first mentioned side and said first mentioned pulley, a hook carried by said pulley block whereby said hook may engage an object such as a boat or wagon box, and said cable is wound on said windlass to draw said object onto and over said roller and onto said trailer, said resilient support comprising a pair of tensile coiled springs horizontally spaced transversely of said frame and respectively having their rear ends adapted to embrace said roller and their front ends adapted to be secured to said object.

7. A structure of the type described having in combination, an elongated frame, a pair of wheels supporting said frame intermediate the ends thereof, an auxiliary vertically disposed frame of considerable height at the front end of said frame, a roller extending transversely of said frame adjacent the rear end thereof, a windlass mounted on said auxiliary frame, a cable secured at one end to one side of said auxiliary frame adjacent the top thereof, a pulley secured to the other side of said auxiliary frame adjacent the top thereof, a second pulley above said windlass, said cable running from said secured end over said first mentioned pulley to said second mentioned pulley and to said windlass, a pulley block and pulley movable on said cable between said first mentioned side and said first mentioned pulley, a hook carried by said pulley block whereby said hook may engage an object such as a boat or wagon box, and said cable is wound on said windlass to draw said object onto and over said roller and onto said trailer, a resilient holding means having a generally horizontal portion and a vertical portion, said means carried by said frame intermediate the sides and adjacent the front end thereof whereby the front end of said object may rest on said horizontal portion and be resiliently supported thereby and also engage said vertical portion.

8. A structure of the type described having in combination, an elongated frame, a pair of wheels supporting said frame intermediate the ends thereof, an auxiliary vertically disposed frame of considerable height at the front end of said frame, a roller extending transversely of said frame adjacent the rear end thereof, a windlass mounted on said auxiliary frame, a cable secured at one end to one side of said auxiliary frame adjacent the top thereof, a pulley secured to the other side of said auxiliary frame adjacent the top thereof, a second pulley above said windlass, said cable running from said secured end over said first mentioned pulley to said second mentioned pulley and to said windlass, a pulley block and pulley movable on said cable between said first mentioned side and said first mentioned pulley, a hook carried by said pulley block whereby said hook may engage an object such as a boat or wagon box, and said cable is wound on said windlass to draw said object onto and over said roller and onto said trailer, spaced resilient means carried by said frame transversely of the same adjacent its front end portion and spaced upwardly therefrom for a short distance, said means having upstanding portions whereby said portion will provide a resilient stop for said object.

9. A structure of the type described having in combination, an elongated frame, a pair of wheels supporting said frame intermediate the ends thereof, an auxiliary vertically disposed frame of considerable height at the front end of said frame, a roller extending transversely of said frame adjacent the rear end thereof, a windlass mounted on said auxiliary frame, a cable secured at one end to one side of said auxiliary frame adjacent the top thereof, a pulley secured to the other side of said auxiliary frame adjacent the top thereof, a second pulley above said windlass, said cable running from said secured end over said first mentioned pulley to said second mentioned pulley and to said windlass, a pulley block and pulley movable on said cable between said first mentioned side and said first mentioned pulley, a hook carried by said pulley block whereby said hook may engage an object such as a boat or wagon box, and said cable is wound on said windlass to draw said object onto and over said roller and onto said trailer, a resilient supporting means extending transversely of the front end portion of said frame and resilient means spaced transversely of said frame and spaced upwardly from the lower side thereof adjacent said first mentioned means whereby said first mentioned means will resiliently support said object from above and said spaced means will support the front end portion of said object from below.

10. A structure of the type described having in combination, an elongated frame, a pair of wheels supporting said frame intermediate the ends thereof, an auxiliary vertically disposed frame of considerable height at the front end of said frame, a roller extending transversely of said frame adjacent the rear end thereof, a windlass mounted on said auxiliary frame, a cable secured at one end to one side of said auxiliary frame adjacent the top thereof, a pulley secured to the other side of said auxiliary frame adjacent the top thereof, a second pulley above said windlass, said cable running from said secured end over said first mentioned pulley to said second mentioned pulley and to said windlass, a pulley block and pulley movable on said cable between said first mentioned side and said first mentioned pulley, a hook carried by said pulley block whereby said hook may engage an object such as a boat or wagon box, and said cable is wound on said windlass to draw said object onto and over said roller and onto said trailer, said windlass having an end portion adapted to carry a shaft, a gear carried on said shaft, a shaft carried by said auxiliary frame adjacent one side thereof and spaced vertically of said first mentioned shaft, a gear carried by said second mentioned shaft and adapted to mesh with said first mentioned gear and having a diameter larger than said first mentioned gear, a third shaft carried by said auxiliary frame and spaced vertically above said second mentioned shaft, a gear carried by said third mentioned shaft having a diameter somewhat smaller than said second mentioned gear and adapted to mesh with the same, a fourth shaft carried by said auxiliary frame and spaced vertically above said third mentioned shaft, a gear carried by said fourth shaft having a diameter smaller than said third mentioned shaft and adapted to mesh with the same, and a member adapted to rotate any one of said shafts and to rotate said gears and windlass whereby said windlass can be rotated at different speeds.

References Cited in the file of this patent

UNITED STATES PATENTS

| | | |
|---|---|---|
| 1,914,098 | Bean | June 13, 1933 |
| 2,442,248 | Sampsell | May 25, 1948 |
| 2,452,937 | Krake | Nov. 2, 1948 |
| 2,485,793 | Vassar | Oct. 25, 1949 |
| 2,545,128 | Young et al. | Mar. 13, 1951 |
| 2,550,230 | Dalton | Apr. 24, 1951 |
| 2,557,203 | Rehberger | June 19, 1951 |
| 2,558,418 | Brueckman | June 26, 1951 |
| 2,571,213 | Cunningham et al. | Oct. 16, 1951 |
| 2,586,485 | Schroeder | Feb. 19, 1952 |
| 2,606,680 | Herman | Aug. 12, 1952 |

FOREIGN PATENTS

| | | |
|---|---|---|
| 726,877 | France | Mar. 14, 1932 |